(12) United States Patent
Chen

(10) Patent No.: US 9,004,436 B2
(45) Date of Patent: Apr. 14, 2015

(54) PEDESTAL STRUCTURE OF CASH REGISTER DISPLAY

(71) Applicant: Posiflex Technology, Inc., New Taipei (TW)

(72) Inventor: Huang-Yan Chen, New Taipei (TW)

(73) Assignee: Posiflex Technology, Inc., New Taipei (TW)

( * ) Notice: Subject to any disclaimer, the term of this patent is extended or adjusted under 35 U.S.C. 154(b) by 159 days.

(21) Appl. No.: 13/845,138

(22) Filed: Mar. 18, 2013

(65) Prior Publication Data

US 2014/0197298 A1    Jul. 17, 2014

(30) Foreign Application Priority Data

Jan. 11, 2013   (TW) .............................. 102101180 A

(51) Int. Cl.
*A47G 29/00*  (2006.01)
*G07G 1/00*  (2006.01)
*F16M 11/10*  (2006.01)
*F16M 11/20*  (2006.01)
*F16M 11/38*  (2006.01)

(52) U.S. Cl.
CPC ............. *G07G 1/0018* (2013.01); *F16M 11/10* (2013.01); *F16M 11/2021* (2013.01); *F16M 11/38* (2013.01); *F16M 2200/044* (2013.01); *Y10S 248/923* (2013.01)

(58) Field of Classification Search
USPC .............. 248/370, 371, 372.1, 917, 919, 920, 248/922, 923, 276.1, 284.1, 286.1, 274.1; 361/679.02, 679.06
See application file for complete search history.

(56) References Cited

U.S. PATENT DOCUMENTS

| | | | | |
|---|---|---|---|---|
| 7,255,317 | B2 * | 8/2007 | Huang et al. | 248/371 |
| 8,070,115 | B2 * | 12/2011 | Wang et al. | 248/157 |
| 8,672,277 | B2 * | 3/2014 | Hsu | 248/121 |
| 2006/0038104 | A1 * | 2/2006 | Choi | 248/370 |
| 2007/0029457 | A1 * | 2/2007 | Baek | 248/372.1 |

* cited by examiner

*Primary Examiner* — Steven Marsh
(74) *Attorney, Agent, or Firm* — CKC & Partners Co., Ltd.

(57) ABSTRACT

A pedestal structure of a cash register display is disclosed, including a base, a supporting arm, a retaining shaft lever, at least one extension spring and a display loading plate. Multiple retaining grooves and an inclined slide walls are arranged on each of two side plates of the base. The supporting arm is pivoted between the two side plates through a first pivot unit, and a first end section of the supporting arm is provided with a slide opening. The retaining shaft lever passes through the slide opening and is positioned in one of the retaining grooves or on the inclined slide wall of each of the side plates. The extension spring is installed between the first pivot unit and the retaining shaft lever. The display loading plate is pivoted on a second end section of the supporting arm.

9 Claims, 9 Drawing Sheets

PEDESTAL STRUCTURE OF CASH REGISTER DISPLAY

RELATED APPLICATIONS

This application claims priority to Taiwan Application Serial Number 102101180, filed Jan. 11, 2013, which is herein incorporated by reference.

BACKGROUND

1. Field of Invention

The invention relates to a pedestal structure. More particularly, the invention relates to a foldable pedestal structure which can adjust a height and a tilt angle of a cash register display,

2. Description of Related Art

A conventional pedestal of a cash register display is pivoted with the bottom part of the cash register display by manually manipulating the cash register display. Through such pivoting, only a tilt angle of the cash register display may be adjusted, while a height thereof cannot be changed. Therefore, different height requirements cannot be satisfied, causing inconvenience and difficulties during use. Furthermore, with the conventional pedestal for a cash register display, a supporting arm thereof is fixed and cannot be folded, so that a large space is occupied by the pedestal during storage and transport.

SUMMARY

The invention provides a foldable pedestal structure which can adjust a height and a tilt angle of a cash register display.

According to an aspect of the invention, a pedestal structure of a cash register display is provided, including a base, a supporting arm, a retaining shaft lever, at least one extension spring and a display loading plate. The base includes a support unit and a loading element arranged in the support unit. The loading element has a bottom plate and two side plates connected at two sides of the bottom plate. The rear edge of each side plate is provided with multiple retaining grooves arranged adjacent to one another in a top-to-bottom configuration, and an inclined slide wall is formed between the top edge and rear edge of each side plate. The supporting arm is pivoted between the two side plates through a first pivot unit. The supporting arm has an arm body, and a first end section and second end section arranged at two ends of the arm body. The first end section is provided with a slide opening. The retaining shaft lever passes through the slide opening, and is positioned in one of the multiple retaining grooves or on the inclined slide wall of each of the side plates. The extension spring is arranged between the first pivot unit and the retaining shaft lever. The display loading plate is pivoted at the second end section of the supporting arm through a second pivot unit.

According to an embodiment of the invention, the arm body of the supporting arm is L-shaped, and the display loading plate is provided with a window for selectively accommodating the second end section of the supporting arm.

According to another embodiment of the invention, the supporting arm further includes a lid disposed on the arm body and second end section of the supporting arm.

According to an embodiment of the invention, for each of the side plates, a limiting wall is arranged underneath and rearwardly to the bottommost retaining groove of the multiple retaining grooves.

According to an embodiment of the invention, the base further includes a demountable protecting cover disposed above the loading element and the first end section of the supporting arm.

According to an embodiment of the invention, the first pivot unit includes two first axle holes respectively formed at approximately middle portions of the two side plates; a second axle hole formed at a position on the supporting arm adjacent to the first end section and corresponding to the first axle hole; and a first rotation axle passing through the first axle holes and the second axle holes. Furthermore, the extension spring is arranged between the first rotation axle and the retaining shaft lever.

According to an embodiment of the invention, the second pivot unit includes two first fixing elements respectively fixed at two sides of the second end section of the supporting arm; two second fixing elements respectively fixed at two sides of the window of the display loading plate; and two second rotation axles respectively passing through and pivotally interconnecting the two first fixing elements and the two second fixing elements.

According to an embodiment of the invention, the display loading plate is provided with multiple connecting holes for securing the cash register display.

With the pedestal structure of the cash register display according to the aspect of the invention, the first end section of the supporting arm is pulled by the retaining shaft lever, and the height of the second end section of the supporting arm can be adjusted depending on the retaining grooves of the loading element in which the retaining shaft lever is engaged, so that the height of the display loading plate pivoted on the second end section and the cash register display thereon can be adjusted. Additionally, when the retaining shaft lever is positioned on the inclined slide walls without being restricted by the retaining grooves, by using the first pivot unit and the second pivot unit as pivot axes, the base, supporting arm and display loading plate can be folded in a horizontal folded state in which the upper and lower parts thereof are overlapped vertically. Therefore, the folded size of the pedestal structure may be reduced.

DETAILED DESCRIPTION

Figure 1:
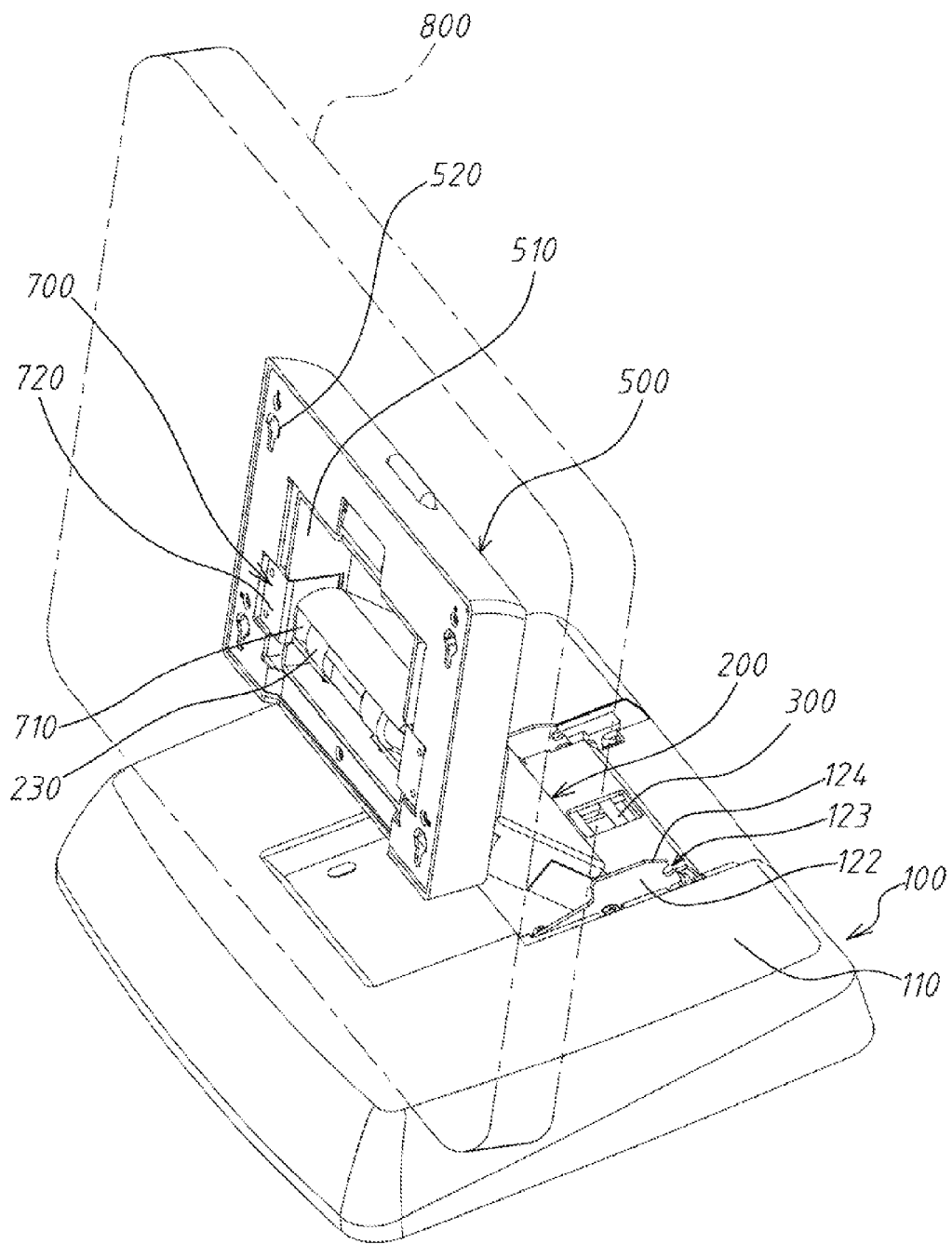
FIG. 1 illustrates a perspective view of a pedestal structure of a cash register display according to an embodiment of the invention.
Figure 2:
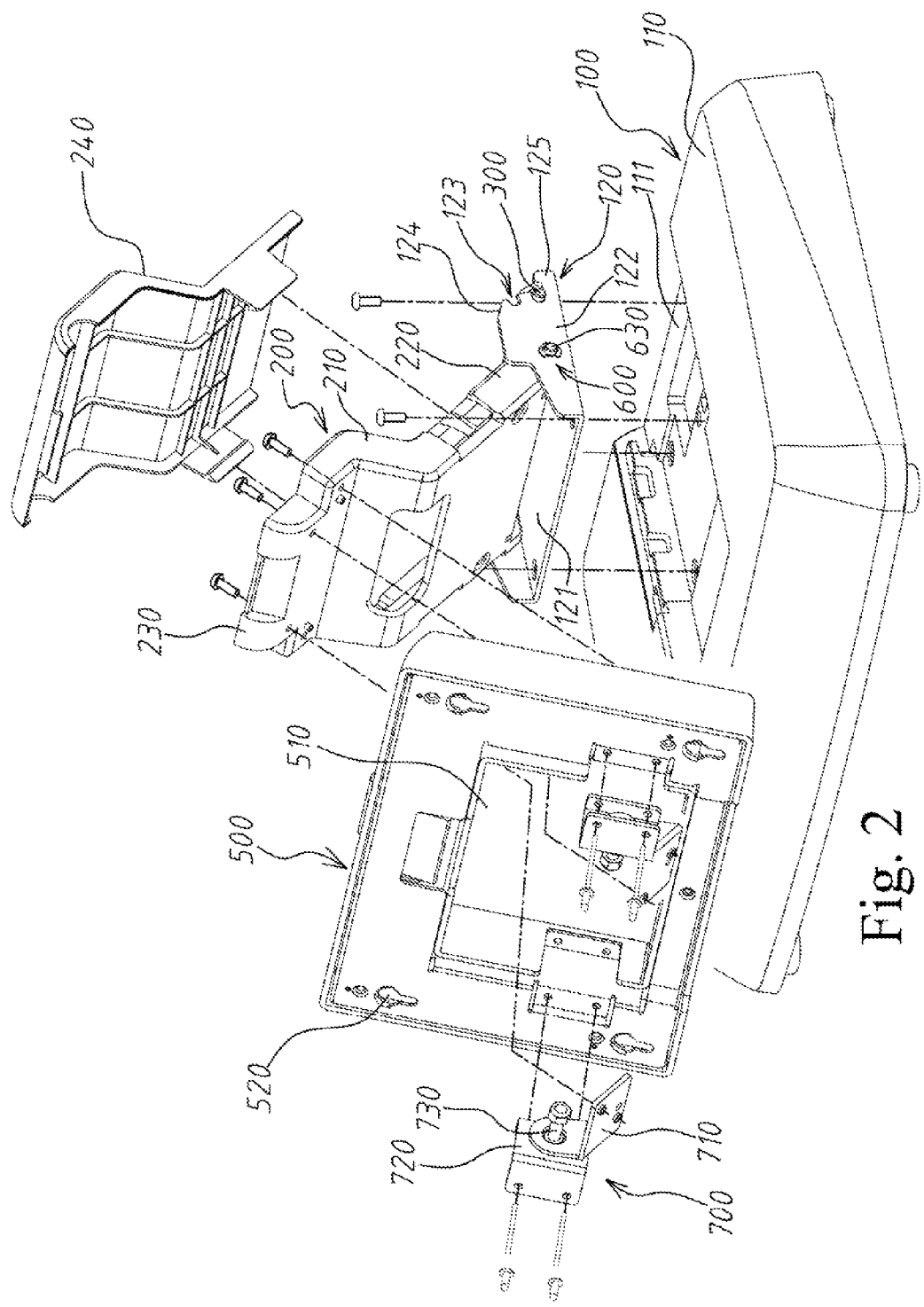
FIG. 2 is an exploded view of the pedestal structure shown in FIG. 1.
Figure 3:
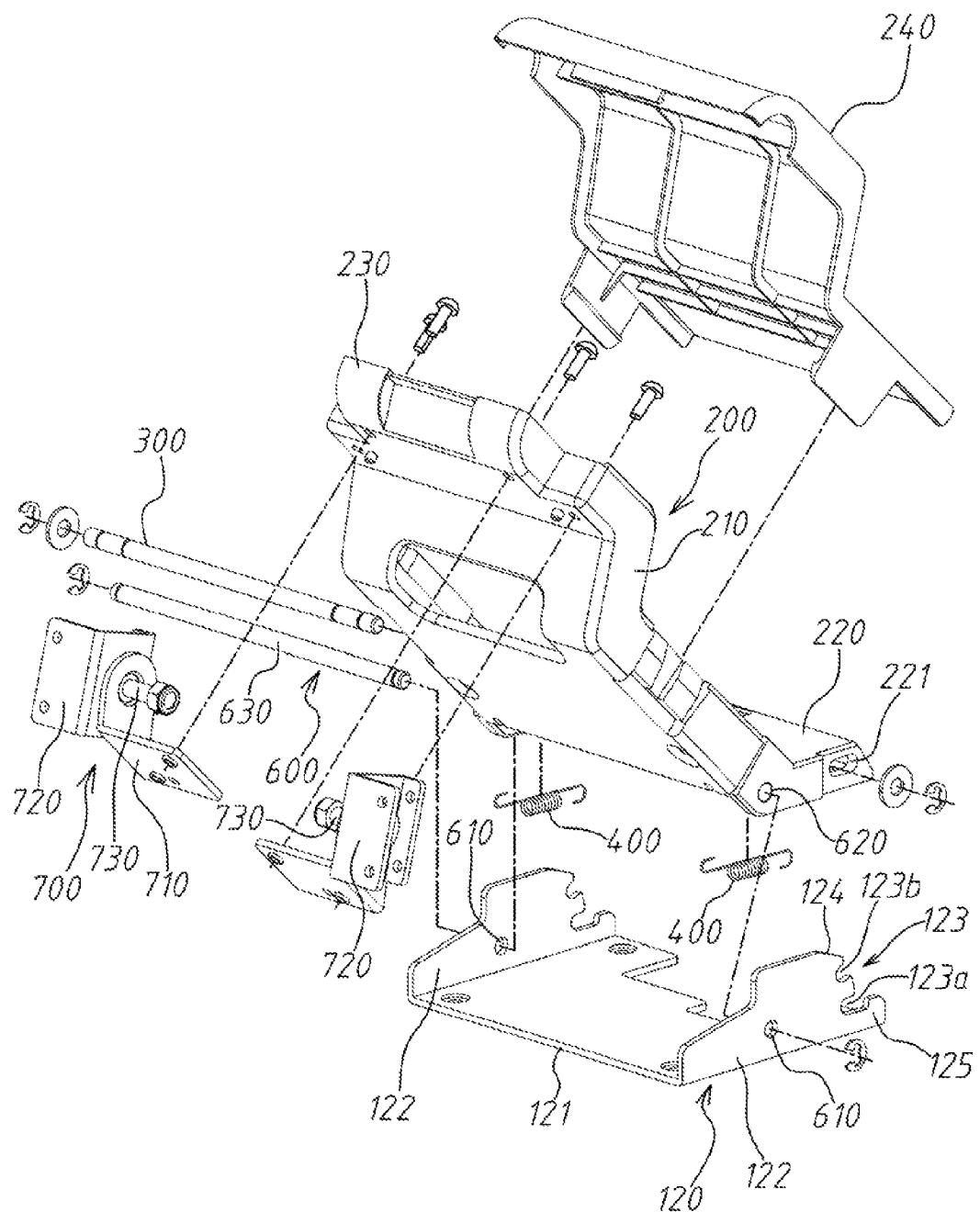
FIG. 3 is a more detailed exploded view of a base and a supporting arm of the pedestal structure shown in FIG. 1.

The foregoing and other technical contents, features and functions of the invention will be clearly presented through the following detailed description of embodiments with reference to the accompanying drawings.

As shown in FIGS. 1-6, according to an embodiment of the invention, a pedestal structure of a cash register display includes a base 100, a supporting arm 200, a retaining shaft lever 300, two extension springs 400, a display loading plate 500, a first pivot unit 600 and a second pivot unit 700.

The base 100 includes a support unit 110 and a loading element 120. The support unit 110 is provided with a concave portion 111 and the loading element 120 is arranged on the concave portion 111. The loading element 120 has a bottom plate 121 and two side plates 122 connected at two sides of the bottom plate 121. A rear edge of each side plate 122 is provided with multiple retaining grooves 123 arranged adjacent to one another in a top-to-bottom configuration. In the embodiments appearing in the accompanying drawings, with respect to the rear edge of each side plate 122, the multiple retaining grooves 123 are shown including a first retaining groove 123a at the bottom of the rear edge, and a second retaining groove 123b at the top of the rear edge and adjacent to the first retaining groove 123a. An inclined slide wall 124 is formed between the top edge and the rear edge of each side plate 122. Moreover, for each side plate 122, a limiting wall 125 is arranged underneath and rearwardly to the bottommost retaining groove of the multiple retaining grooves 123 (i.e., the first retaining groove 123a in the embodiments appearing in the accompanying drawings). The limiting wall 125 prevents the retaining shaft lever 300, aspects of which will be described hereinafter, from being removed.

The supporting arm 200 has an arm body 210, and a first end section 220 and a second end section 230 positioned at two ends of the arm body 210. The arm body 210 is L-shaped. The first end section 220 is provided with a slide opening 221 which can be pulled by the retaining shaft lever 300 in a manner that will be described hereinafter. The supporting arm 200 is pivoted between the two side plates 122 of the base 100 through the first pivot unit 600.

The first pivot unit 600 pivotally interconnects the base 100 and the supporting arm 200. The first pivot unit 600 includes two first axle holes 610, a second axle hole 620 and a first rotation axle 630. The two first axle holes 610 are respectively formed at approximately middle portions of the two side plates 122 of the base 100. The second axle hole 620 is formed at a position on the supporting arm 200 adjacent to the first end section and corresponding to the first axle holes 610. The first rotation axle 630 passes through the first axle holes 610 and the second axle hole 620. Therefore, the base 100 and the supporting arm 200 are pivotally connected to each other by using the first rotation axle 630 as a pivot axis therebetween.

The retaining shaft lever 300 passes through the slide opening 221 of the supporting arm 200, and is positioned in one of the multiple retaining grooves 123 of the two side plates 122 of the base 100 or is positioned on the inclined slide walls 124. Each of the two extension springs 400 is connected at one end to the first rotation axle 630 of the first pivot unit 600 and the retaining shaft lever 300, and the two extension springs 400 are disposed in this manner on opposite sides of the supporting arm 200 adjacent respectively to the two side plates 122. Therefore, the supporting arm 200 and the retaining shaft lever 300 can rotate by using the first rotation axle 630 as a pivot axis. Due to the elasticity of the extension springs 400, the retaining shaft lever 300 is securely engaged in one of the retaining grooves 123 to position the supporting arm 200. Alternatively, also due to elasticity of the extension springs 400, the retaining shaft lever 300 can slide against the inclined slide walls 124, and thus the supporting arm 200 can be freely folded.

The display loading plate 500 is pivoted at the second end section 230 of the supporting arm 200 through a second pivot unit 700. The display loading plate 500 is provided with a window 510 for selectively accommodating the second end section 230 of the supporting arm 200. When the display loading plate 500 is folded, the display loading plate 500 does not hinder movement of the second end section 230 of the supporting arm 200 and accommodates the same through the window 510, so that the display loading plate 500 can be folded in a horizontal state. The display loading plate 500 is provided with multiple connecting holes 520 for use in connecting a cash register display 800 to the display loading plate 500.

The second pivot unit 700 includes two first fixing elements 710, two second fixing elements 720 and two second rotation axles 730. The two first fixing elements 710 are respectively fixed at two sides of the second end section 230 of the supporting arm 200. The two second fixing elements 720 are respectively fixed at two sides of the window 510 of the display loading plate 500. The two second rotation axles 730 respectively pass through and pivotally interconnect the two first fixing elements 710 and the two second fixing elements 730. Therefore, the display loading plate 500 and the cash register display 800 installed thereon can be folded in a horizontal folded state or the tilt angle thereof can be adjusted by using the two second rotation axles 730 as pivot axes therebetween.

The base 100 further includes a demountable protecting cover 130 that is disposed above the loading element 120 and the first end section 220 of the supporting arm 200. During normal use, the protecting cover 130 has the function of covering and protecting the loading element 120. When it necessary to adjust the height of the cash register display 800 or fold the cash register display 800, the protecting cover 130 is removed to expose the loading element 120 and the retaining shaft lever 300, so as to facilitate the adjusting or folding operation.

The supporting arm 200 further includes a lid 240 disposed on the arm body 210 and the second end section 230 of the supporting arm 200 to improve the appearance of the supporting arm 200.

Figure 4:
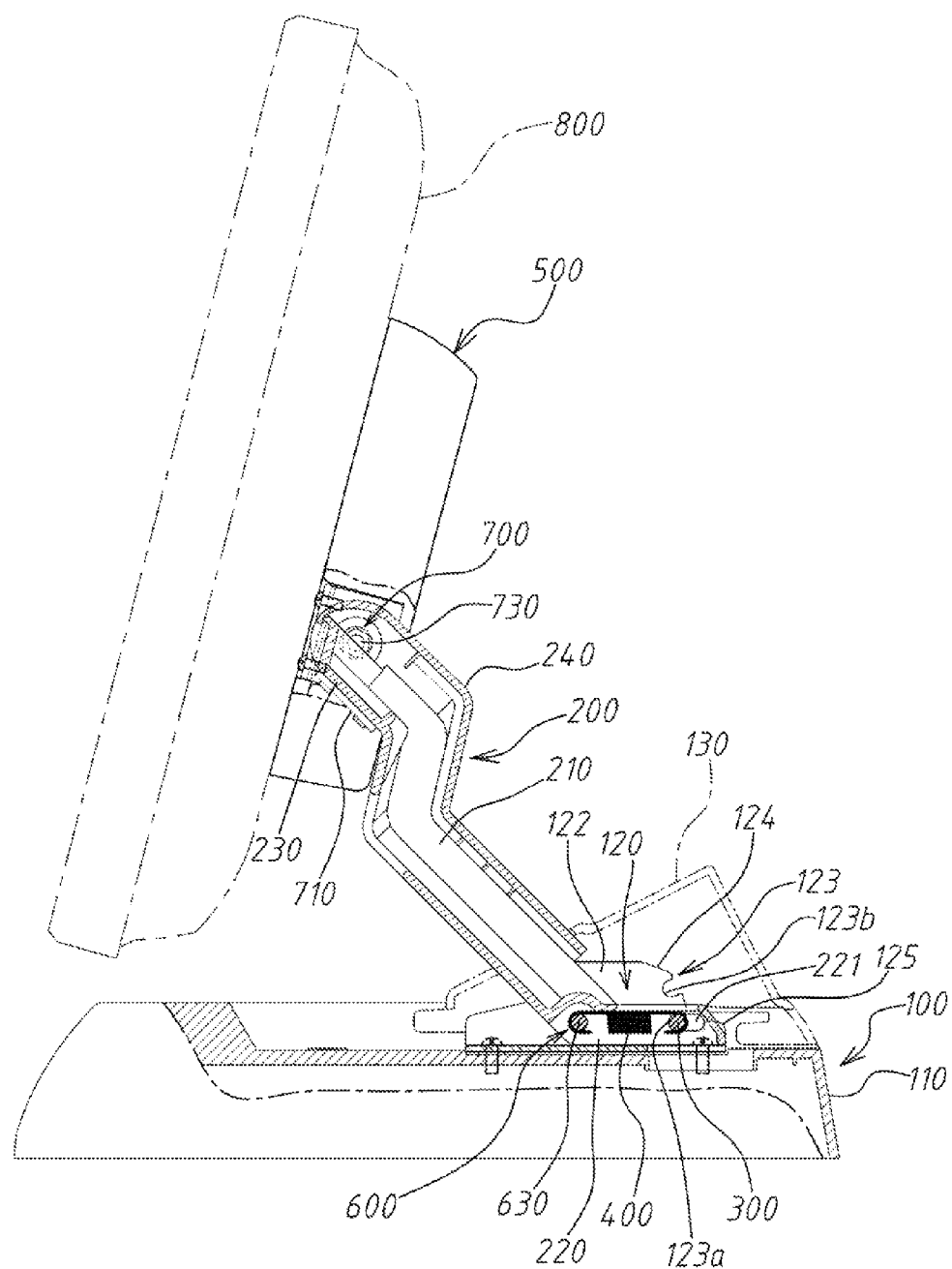
FIG. 4 is a side cross-sectional view of the pedestal structure shown in FIG. 1 in a first using state.
Figure 5:
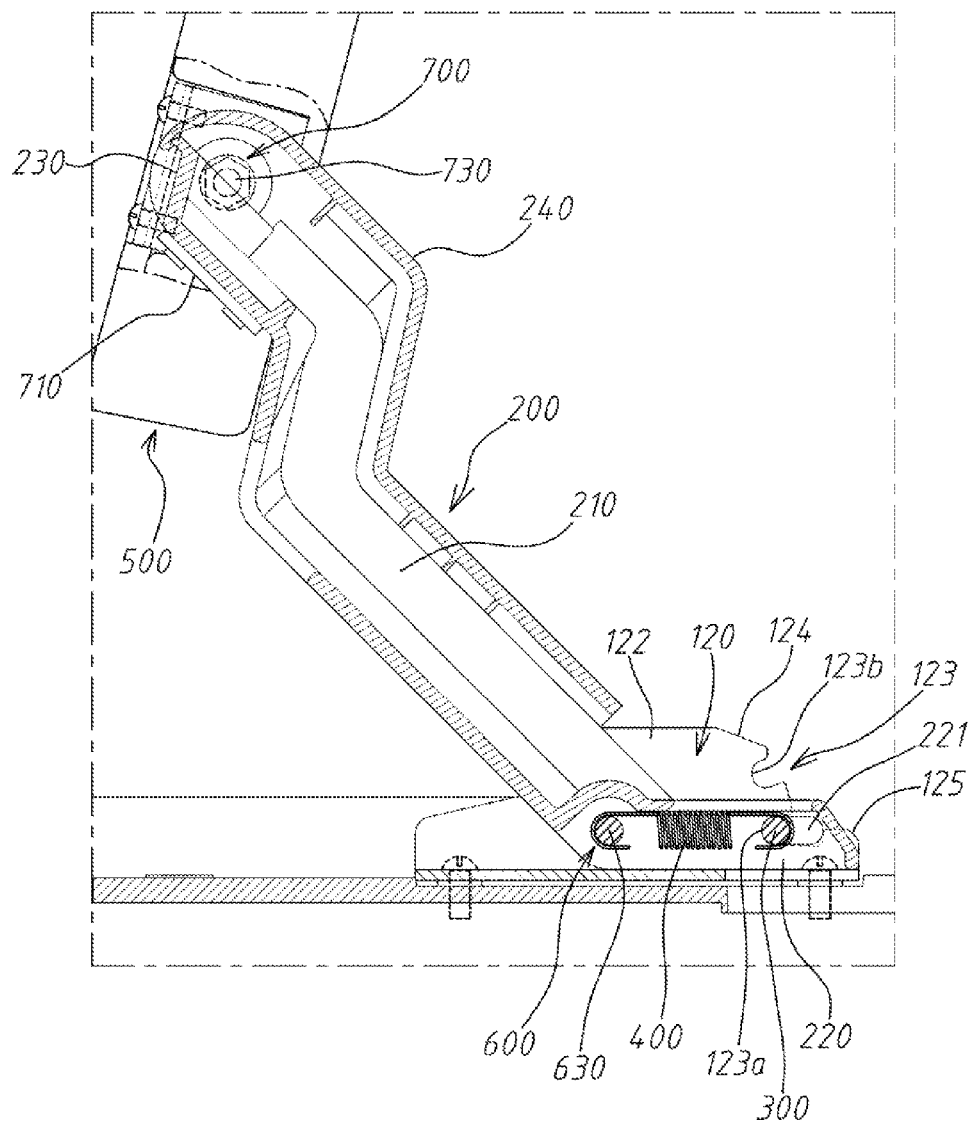
FIG. 5 is a partial enlarged view of the pedestal structure shown in FIG. 4.
Figure 6:
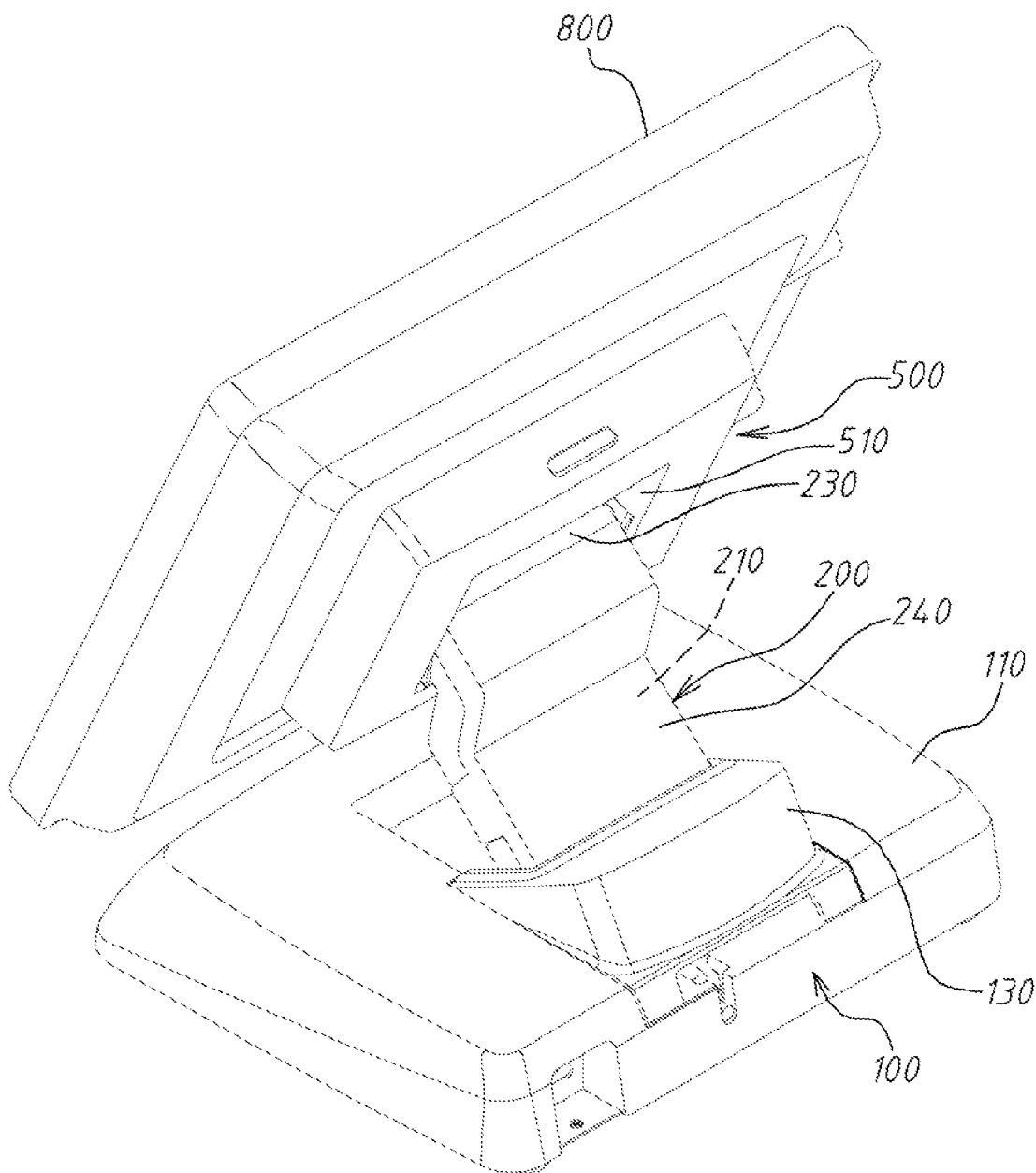
FIG. 6 is a perspective view of the pedestal structure shown in FIG. 4 when a cash register display is actually mounted on the pedestal structure.
Figure 7:
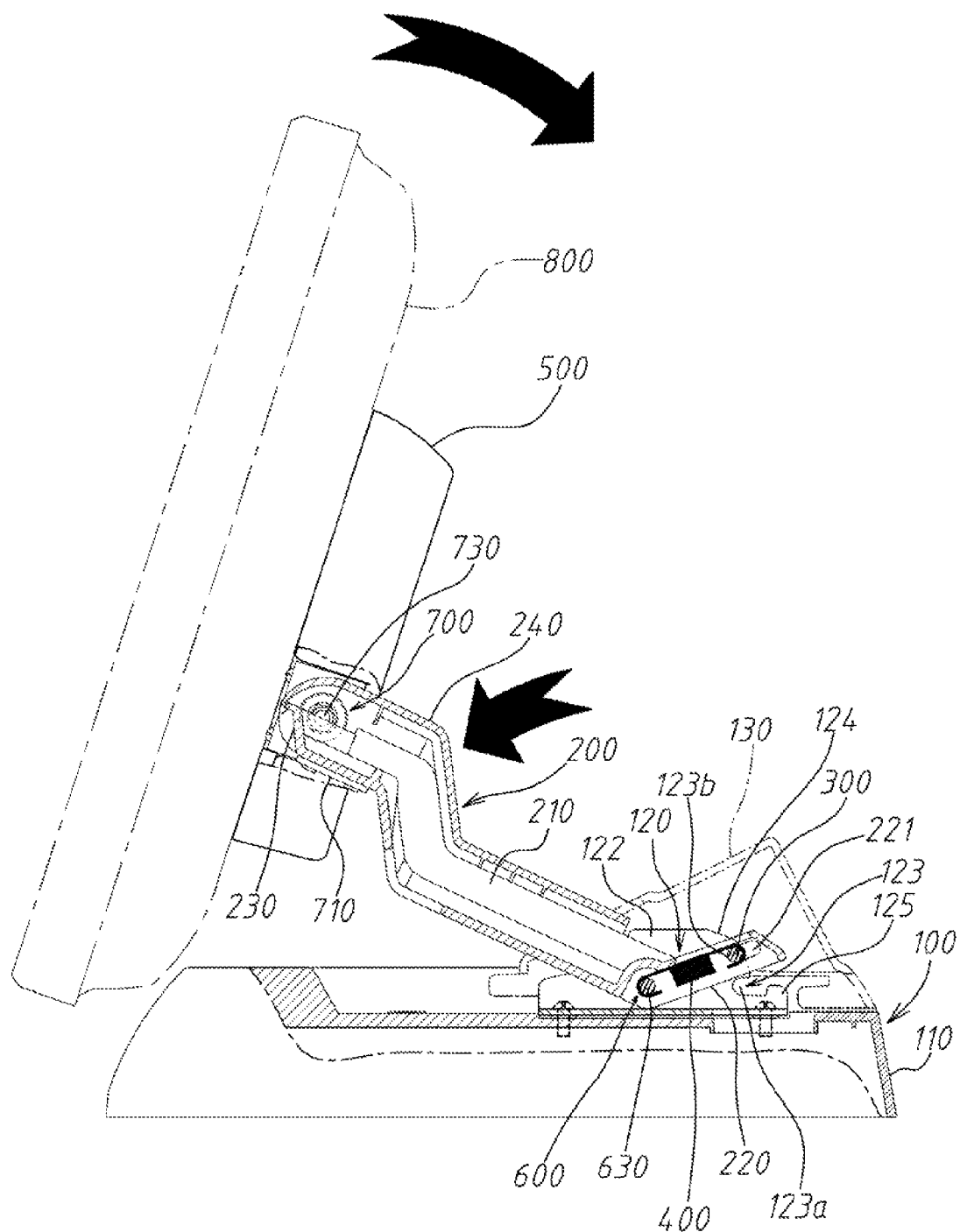
FIG. 7 is a side cross-sectional view of the pedestal structure shown in FIG. 1 in a second using state.

With the pedestal structure of the cash register display of the invention described above, the first end section 220 of the supporting arm 200 is pulled by the retaining shaft lever 300, and the height of the second end section 230 of the supporting arm 200 can be adjusted depending on the retaining grooves 123 of the loading element 120 in which the retaining shaft lever 300 is engaged, so that the height of the display loading plate 500 pivoted on the second end section 230 and the cash register display 800 thereon can be adjusted. As shown in FIGS. 4-6, as an example, the retaining shaft lever 300 may be pulled outwards (i.e., rearwardly) to the first retaining grooves 123a at the bottom of the side plates 122, so that the second end section 230 of the supporting arm 200 and the display loading plate 500 and cash register display 800 positioned thereon move upward by using the first rotation axle 630 as a pivot axis. Moreover, due to the elasticity of the extension springs 400, the retaining shaft lever 300 is engaged in the first retaining grooves 123a to thereby securely maintain the cash register display 800 in a use state at a high position. In contrast, as shown in FIG. 7, the retaining shaft lever 300 may be pulled outwards (i.e., rearwardly) to the second retaining grooves 123b at the top of the side plates 122, so that the second end section 230 of the supporting arm 200 and the display loading plate 500 and cash register display 800 positioned thereon move downward by using the first rotation axle 630 as a pivot axis. Here also, due to the elasticity of the extension springs 400, the retaining shaft lever 300 is engaged in the second retaining groove 123b to thereby securely maintain the cash register display 800 in a use state at a low position.

The number of the retaining grooves 123 formed in each of the side plates 122 is not limited to two, and may be more than two. The cash register display 800 can be adjusted to a greater number of different heights by providing more of the retaining grooves 123 in the side plates 122.

At each different height shown in FIGS. 4 and 7, the tilt angle of the cash register display 800 can be adjusted by using the second rotation axles 730 as pivot axes.

Figure 8:
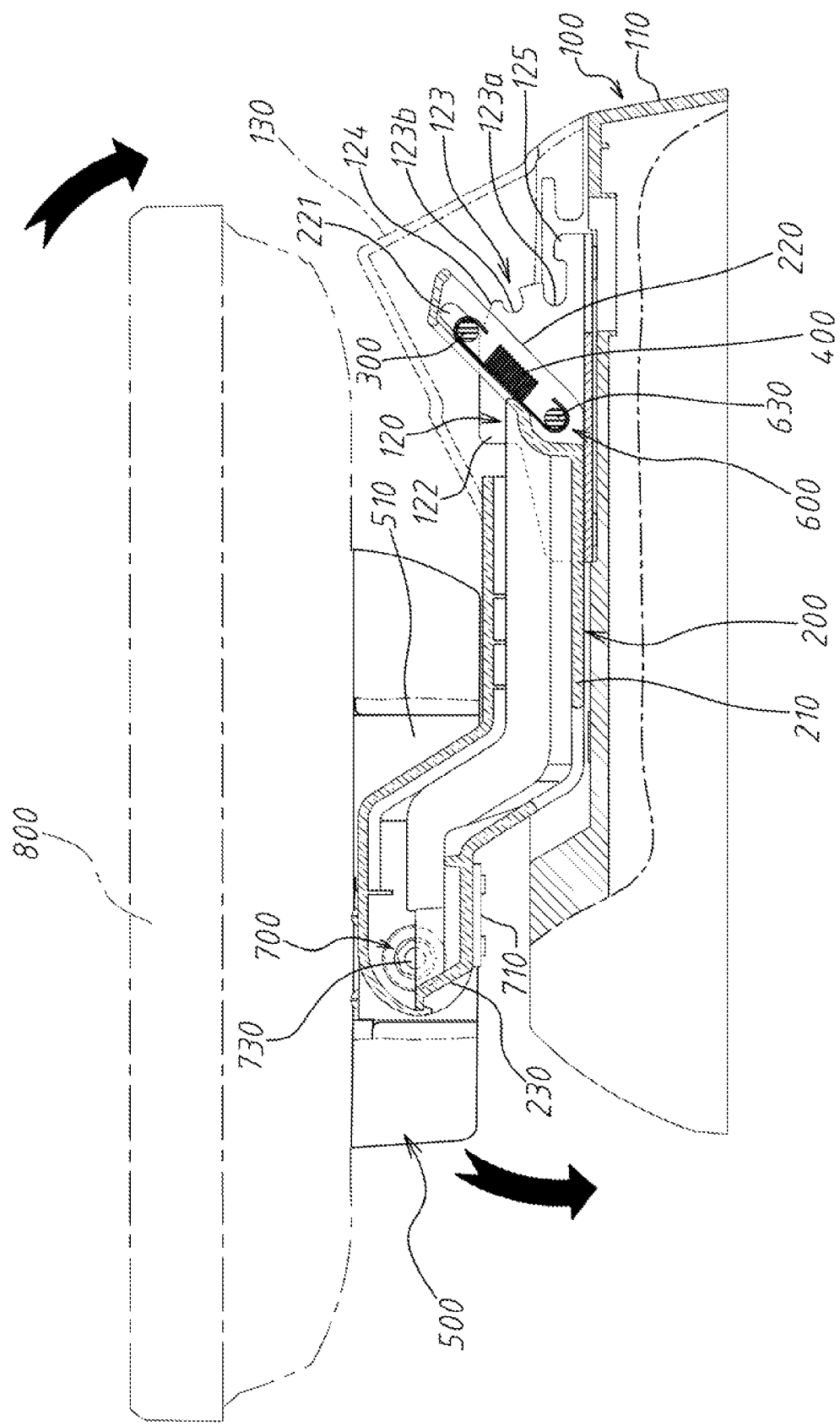
FIG. 8 is a side cross-sectional view of the pedestal structure shown in FIG. 1 in a folded state.
Figure 9:
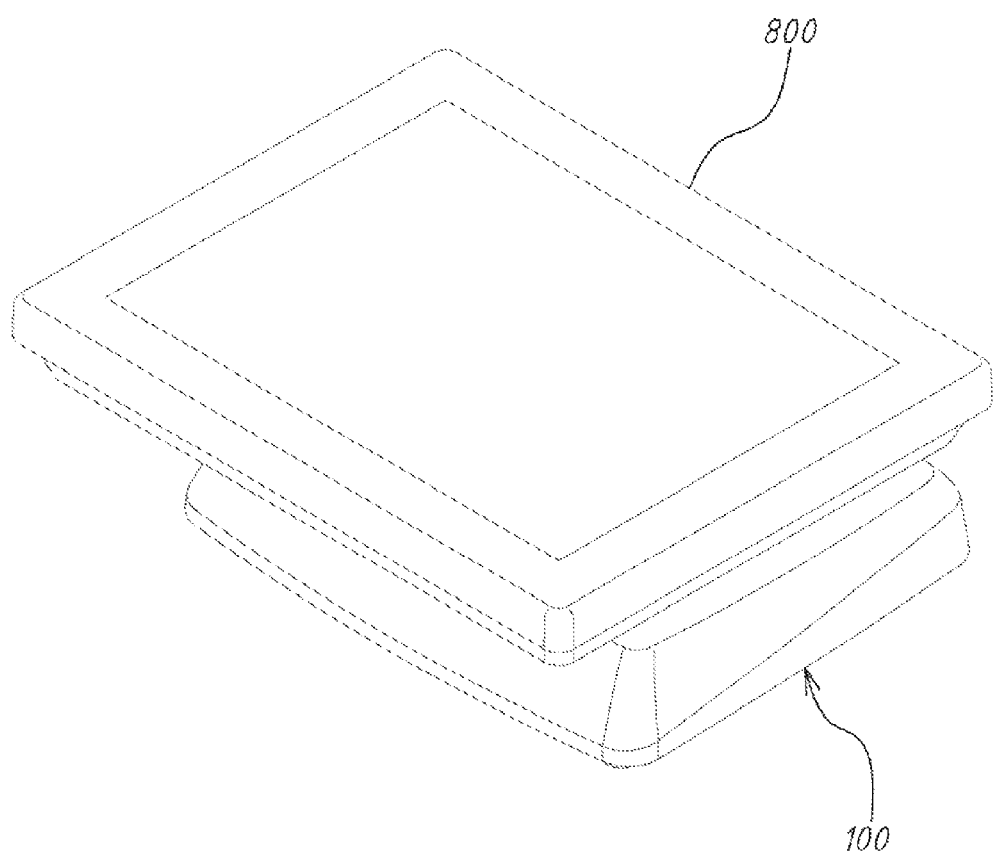
FIG. 9 is a perspective view of the pedestal structure shown in FIG. 8 when a cash register display is actually mounted on the pedestal structure.

As shown in FIGS. 8 and 9, when the retaining shaft lever 300 is pulled outwards (i.e., rearwardly) to the inclined slide walls 124, the retaining shaft lever 300 is no longer restricted in movement by the retaining grooves 123. At this time, the first end section 220 of the supporting am 200 and the base 100, and the second end section 230 of the supporting arm 200 and the display loading plate 500 can be folded in a horizontal folded state in such a manner that the cash register display 800, the supporting arm 200 and the base 100 are completely vertically overlapped by using the first rotation axle 630 and the second rotation axle 730 as pivot axes. Accordingly, the folded size of these elements is reduced, such that the space for storage and transport are greatly minimized.

Although the present disclosure has been described with reference to the embodiments thereof, it is apparent to those skilled in the art that a variety of modifications and changes may be made without departing from the scope of the present disclosure which is intended to be defined by the appended claims.

What is claimed is:

1. A pedestal structure of a cash register display, comprising:
   a base comprising a support unit and a loading element arranged in the support unit, wherein the loading element has a bottom plate and two side plates connected at two sides of the bottom plate, each side plate comprising a top edge and a rear edge, the rear edge of each side plate is provided with multiple retaining grooves arranged adjacent to one another in a top-to-bottom configuration, and an inclined slide wall is formed between the top edge and the rear edge of each side plate;
   a supporting arm pivoted between the two side plates through a first pivot unit, wherein the supporting arm has an arm body, and a first end section and second end section arranged at two ends of the arm body, and the first end section is provided with a slide opening;
   a retaining shaft lever passing through the slide opening, and positioned in one of the multiple retaining grooves or on the inclined slide wall of each of the side plates; at least one extension spring installed between the first pivot unit and the retaining shaft lever; and
   a display loading plate pivoted at the second end section of the supporting arm through a second pivot unit.

2. The pedestal structure of the cash register display of claim 1, wherein the arm body of the supporting arm is L-shaped, and the display loading plate is provided with a window for selectively accommodating the second end section of the supporting arm.

3. The pedestal structure of the cash register display of claim 2, wherein the supporting arm further comprises a lid disposed on the arm body and second end section of the supporting arm.

4. The pedestal structure of the cash register display of claim 1, wherein for each of the side plates, a limiting wall is arranged underneath and rearwardly to the bottommost retaining groove of the multiple retaining grooves.

5. The pedestal structure of the cash register display of claim 1, wherein the support unit of the base is provided with a concave portion, and the loading element, is arranged in the concave portion.

6. The pedestal structure of the cash register display of claim 5, wherein the base further comprises a demountable protecting cover disposed above the loading element and the first end section of the supporting arm.

7. The pedestal structure of the cash register display of claim 1, wherein the first, pivot, unit comprises:
   two first axle holes respectively formed at approximately middle portions of the two side plates;
   a second axle hole formed at a position on the supporting arm adjacent to the first end section and corresponding to the first axle holes; and
   a first rotation axle passing through the first axle holes and the second axle holes, wherein the extension spring is installed between the first rotation axle and the retaining shaft lever.

8. The pedestal structure of the cash register display of claim 2, wherein the second pivot unit comprises:
   two first fixing elements respectively fixed at two sides of the second end section of the supporting arm;
   two second fixing elements respectively fixed at two sides of the window of the display loading plate; and
   two second rotation axles respectively passing through and pivotally interconnecting the two first fixing elements and the two second fixing elements.

9. The pedestal structure of the cash register display of claim 1, wherein the display loading plate is provided with multiple connecting holes.

* * * * *